United States Patent
Ichikawa

(10) Patent No.: US 11,738,649 B2
(45) Date of Patent: Aug. 29, 2023

(54) FUEL CELL VEHICLE

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 439 days.

(21) Appl. No.: 17/119,502

(22) Filed: Dec. 11, 2020

(65) Prior Publication Data

US 2021/0188102 A1 Jun. 24, 2021

(30) Foreign Application Priority Data

Dec. 23, 2019 (JP) ................. 2019-231243

(51) Int. Cl.
| | |
|---|---|
| *B60L 50/75* | (2019.01) |
| *B60L 58/12* | (2019.01) |
| *B60L 58/30* | (2019.01) |
| *B60L 53/50* | (2019.01) |
| *H01M 8/04858* | (2016.01) |
| *H01M 8/04082* | (2016.01) |
| *H01M 16/00* | (2006.01) |

(52) U.S. Cl.
CPC ............... *B60L 50/75* (2019.02); *B60L 53/50* (2019.02); *B60L 58/12* (2019.02); *B60L 58/30* (2019.02); *H01M 8/0494* (2013.01); *H01M 8/04201* (2013.01); *H01M 16/006* (2013.01); *H01M 2220/20* (2013.01); *H01M 2250/20* (2013.01)

(58) Field of Classification Search
CPC .......... H01M 8/04201; H01M 8/0494; H01M 16/006

See application file for complete search history.

(56) References Cited

U.S. PATENT DOCUMENTS

2012/0115057 A1  5/2012  Yoshida
2017/0203669 A1  7/2017  Kato et al.

FOREIGN PATENT DOCUMENTS

| JP | 2007-244036 A | 9/2007 |
|---|---|---|
| WO | 2011004493 A1 | 1/2011 |
| WO | 2016/151695 A1 | 9/2016 |

*Primary Examiner* — Sarah A. Slifka
(74) *Attorney, Agent, or Firm* — Dinsmore & Shohl LLP

(57) ABSTRACT

An FCV includes an FC system and a battery. The FC system includes an FC stack and a boost converter that adjusts output from the FC stack. An FDC-ECU controls the boost converter to adjust an SOC of the battery to a target SOC while electric power is supplied from the FC stack to an inverter. Then, the FDC-ECU lowers the target SOC with decrease in remaining amount of hydrogen in a hydrogen tank.

5 Claims, 9 Drawing Sheets

FCEV MODE

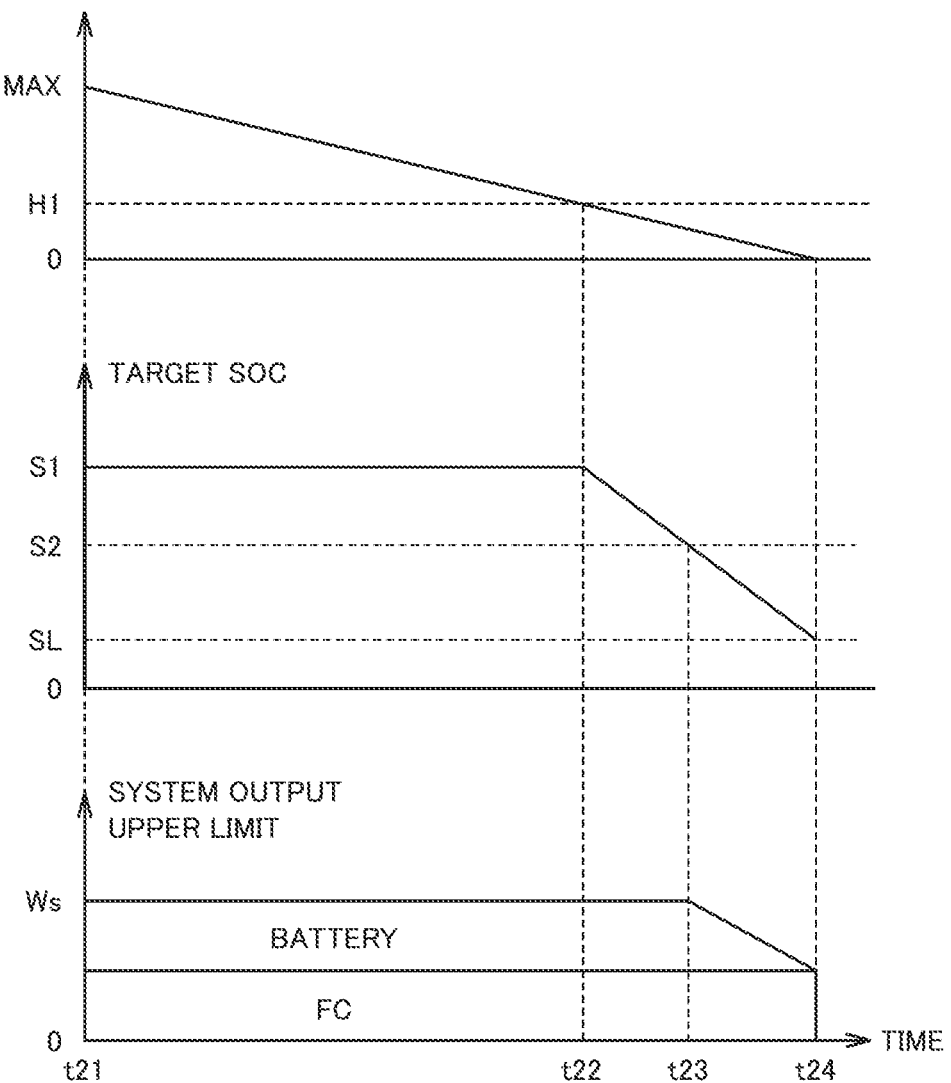

FUEL CELL VEHICLE

CROSS REFERENCE TO RELATED APPLICATIONS

This nonprovisional application is based on Japanese Patent Application No. 2019-231243 filed with the Japan Patent Office on Dec. 23, 2019, the entire contents of which are hereby incorporated by reference.

BACKGROUND

Field

The present disclosure relates to a fuel cell vehicle.

Description of the Background Art

WO2011/004493 discloses a fuel cell vehicle on which fuel cells are mounted (a fuel cell being referred to as an "FC" and a fuel cell vehicle being referred to as an "FCV" below). The FCV includes an FC stack and a battery. The battery functions as a source of storage of excessive electric power, a source of storage of regenerative energy during regenerative braking, and an energy buffer in case of variation in load with acceleration or deceleration of a vehicle.

In an FCV including FCs and a power storage such as a battery, there is a great difference in energy amount between hydrogen serving as fuel for the FCs and electric power stored in the power storage. In general, energy of electric power stored in the power storage is lower than hydrogen energy. Therefore, when fuel (hydrogen) is finished up earlier than a state of charge (SOC) of the power storage, although a vehicle can thereafter travel with electric power stored in the power storage, traveling performance is suddenly significantly restricted at the time point when fuel runs out.

SUMMARY

The present disclosure was made to solve such a problem, and an object of the present disclosure is to avoid sudden significant restriction of traveling performance due to early run-out of fuel for FCs in an FCV including the FCs and a power storage.

An FCV according to the present disclosure includes an FC system output of which can be adjusted, a power storage, a driving device that receives electric power from at least one of the FC system and the power storage and generates travel power, and a controller that controls output from the FC system to adjust an SOC of the power storage to a target SOC while electric power is supplied from the FC system to the driving device. When a remaining amount of fuel in the FC system decreases, the controller lowers the target SOC.

As set forth above, by lowering the target SOC of the power storage when a remaining amount of fuel decreases, in general, electric power is provided also from the power storage to the driving device and hence preferential use of the FC over the power storage can be suppressed. Therefore, according to the FCV, sudden significant restriction of traveling performance due to early run-out of fuel for the FC can be avoided.

When the remaining amount of fuel in the FC becomes smaller than a threshold value, the controller may lower the target SOC with decrease in the remaining amount of fuel.

When the SOC lowers with lowering in target SOC, output from the power storage is restricted and hence traveling performance is restricted. Since the target SOC is lowered when the remaining amount of fuel becomes smaller than the threshold value in the FCV, output from the power storage is secured and sufficient traveling performance can be secured until the remaining amount of fuel decreases to the threshold value.

The controller may lower the target SOC with decrease in the remaining amount of fuel such that the target SOC attains to a lower limit value at the time when fuel in the FC system runs out.

Thus, such a situation that one of run-out of fuel and the SOC reaching the lower limit value precedes the other and one of the FC system and the power storage is unable to provide output can be avoided. Consequently, sudden significant restriction of traveling performance can be avoided.

The FC system may include a tank where fuel (hydrogen) is stored, an FC stack that generates electric power with fuel stored in the tank, and a converter that adjusts output from the FC stack. The power storage may electrically be connected to a power line between the converter and the driving device.

According to such a configuration, output from the FC stack and the power storage can be adjusted by controlling the converter. For example, by reducing output from the FC stack relative to travel power, output from the power storage can be increased. Thus, sudden significant restriction of traveling performance due to early run-out of fuel for the FC can be avoided.

The FCV may further include a charger that charges the power storage with a power supply outside the vehicle.

According to the FCV, travel over a long distance can be achieved with fuel (hydrogen) stored in the tank and electric power supplied from the outside of the vehicle and stored in the power storage.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 13 is a diagram showing transition of a remaining amount of hydrogen, a target SOC, and a system output upper limit when the travel mode is set to the FCEV mode in the second embodiment.

DETAILED DESCRIPTION

Figure 1:
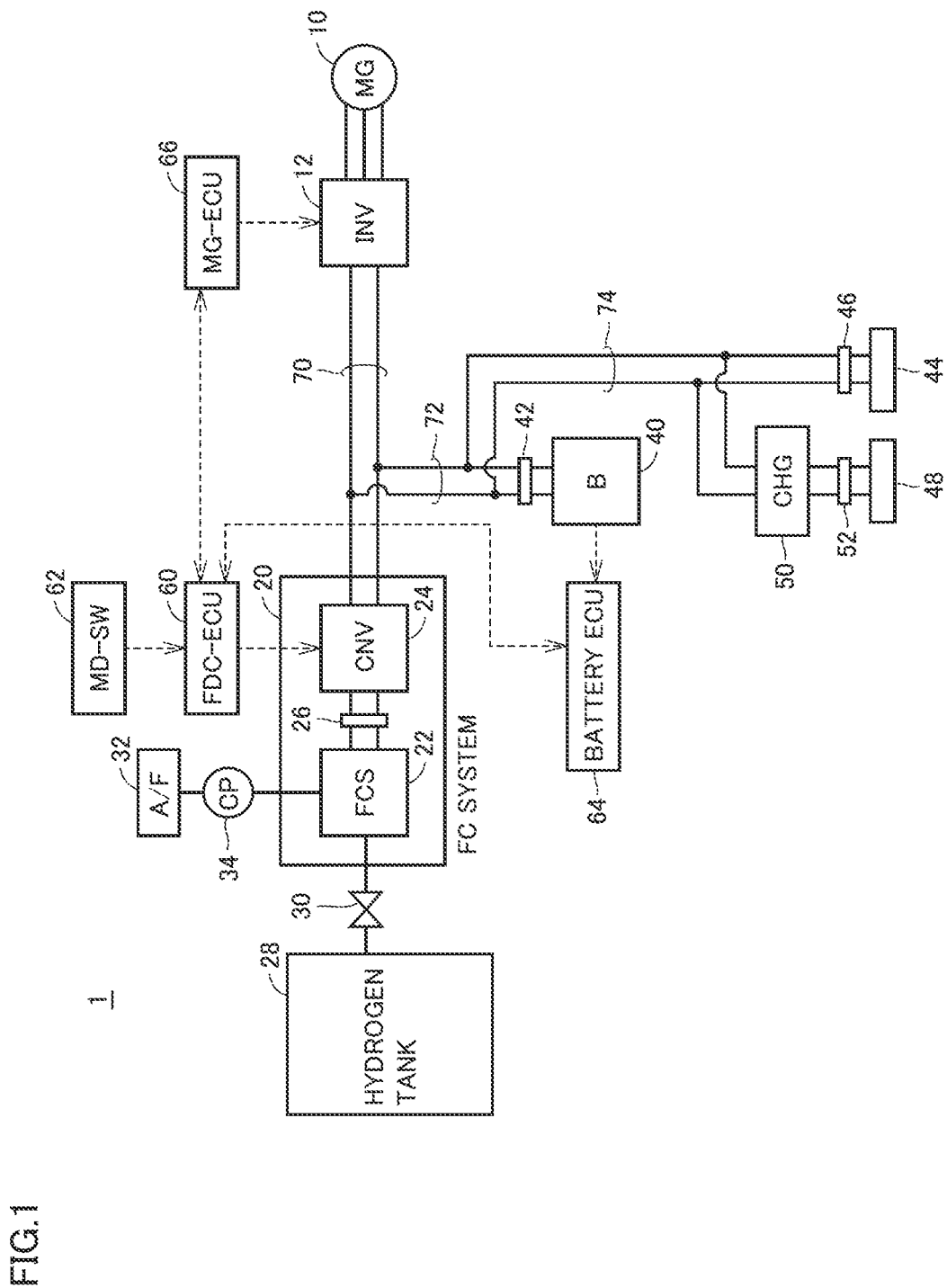
FIG. 1 is a diagram showing an overall configuration of an FCV according to a first embodiment of the present disclosure.

An embodiment of the present disclosure will be described below in detail with reference to the drawings. The same or corresponding elements in the drawings have the same reference characters allotted and description thereof will not be repeated.

First Embodiment

FIG. 1 is a diagram showing an overall configuration of an FCV 1 according to a first embodiment of the present disclosure. Referring to FIG. 1, FCV 1 includes a motor generator (which is referred to as an "MG" below) 10, an inverter 12, an FC system 20, a hydrogen tank 28, a supply valve 30, an air filter 32, and a compressor 34.

MG 10 is an alternating-current (AC) rotating electric machine, and it is, for example, a three-phase AC synchronous motor having a permanent magnet embedded in a rotor. MG 10 generates rotational driving force as it is driven by inverter 12. Driving force generated by MG 10 is transmitted to a not-shown drive wheel. During braking of FCV 1, MG 10 serves as a generator and generates electric power. Electric power generated by MG 10 is rectified by inverter 12 and rectified electric power can be stored in a battery 40.

Inverter 12 is provided between a power line 70 and MG 10 and drives MG 10 based on a drive signal from an MG-ECU 66 (which will be described later). Inverter 12 is implemented, for example, by a bridge circuit including switching elements of three phases.

FC system 20 includes an FC stack 22, a boost converter 24, and a relay 26. FC stack 22 is, for example, a structure in which a plurality of (for example, several ten to several hundred) cells of a solid polymer type are stacked in series. Each cell is made, for example, by joining a catalyst electrode to each of opposing surfaces of an electrolyte membrane and sandwiching the membrane between conductive separators. Each cell generates electric power as a result of electrochemical reaction between hydrogen supplied to an anode and oxygen (air) supplied to a cathode.

Boost converter 24 boosts electric power (for example, at several hundred V) generated by FC stack 22 based on a control signal from an FDC-ECU 60 (which will be described later) and outputs boosted electric power to power line 70. Relay 26 is provided in an electric path between FC stack 22 and boost converter 24 and opened while a vehicle system remains stopped or while FC system 20 is not used.

Hydrogen tank 28 stores hydrogen as fuel supplied to FC stack 22. Hydrogen tank 28 is a high pressure tank that is light in weight and high in strength and includes, for example, a carbon fiber reinforced plastic layer, and can store, for example, hydrogen at several ten MPa. Hydrogen is supplied from hydrogen tank 28 through supply valve 30 to FC stack 22.

Compressor 34 is a device for supplying oxygen to FC stack 22. Compressor 34 suctions oxygen (air) through air filter 32, compresses oxygen (air), and supplies compressed oxygen (air) to FC stack 22.

FCV 1 further includes battery 40, a direct current (DC) inlet 44, an AC inlet 48, a charger 50, and relays 42, 46, and 52.

Battery 40 is a chargeable and dischargeable power storage. Battery 40 includes a battery assembly constituted of a plurality of cells (for example, several hundred cells). Each cell is, for example, a secondary battery such as a lithium ion battery or a nickel metal hydride battery. A lithium ion secondary battery is a secondary battery containing lithium as a charge carrier, and may include not only a general lithium ion secondary battery containing a liquid electrolyte but also what is called an all-solid-state battery containing a solid electrolyte. A power storage element such as an electric double layer capacitor may be employed instead of battery 40.

Battery 40 is connected to a power line 72 with relay 42 being interposed, and power line 72 is connected to power line 70. Battery 40 stores electric power for driving MG 10 and supplies electric power to inverter 12 through power lines 72 and 70. Battery 40 is charged with electric power generated by MG 10 during braking of FCV 1. Battery 40 can function as an energy buffer that accommodates variation in load caused by acceleration and deceleration of FCV 1 or stores electric power generated by MG 10 during braking of FCV 1.

In the present embodiment, battery 40 can be charged with electric power supplied from a power supply (not shown) outside a vehicle through DC inlet 44 or AC inlet 48 (charging of battery 40 by a power supply outside the vehicle being also referred to as "external charging" below).

DC inlet 44 is connected to a power line 74 with relay 46 being interposed and power line 74 is connected to power line 72. DC inlet 44 is constructed such that a connector of a DC charging cable that extends from a charging stand (not shown) outside the vehicle can be fitted thereto, and DC inlet 44 receives DC power at a high voltage supplied from the charging stand and outputs DC power to power line 74.

AC inlet 48 is connected to charger 50 with relay 52 being interposed. AC inlet 48 is constructed such that a connector of an AC charging cable that extends from a charging stand outside the vehicle can be fitted thereto, and AC inlet 48 receives AC power (for example, system power) supplied from the charging stand and outputs AC power to charger 50. Charger 50 is connected to power line 74 and converts AC power input from AC inlet 48 to a voltage level of battery 40 and outputs DC power to power line 74.

Relay 42 is provided between battery 40 and power line 72 and closed while the system of FCV 1 is ON or while external charging is being carried out. Relay 46 is provided between DC inlet 44 and power line 74 and closed during external charging (DC charging) through DC inlet 44. Relay 52 is provided between AC inlet 48 and charger 50 and closed during external charging (AC charging) through AC inlet 48 and charger 50.

FCV 1 is thus a plug-in FCV in which battery 40 can be charged with a power supply outside the vehicle connected to DC inlet 44 or AC inlet 48, and it can travel with electric power stored in battery 40 by external charging.

FCV 1 further includes FDC-electronic control unit (ECU) 60, a mode switch (MD-SW) 62, a battery ECU 64, and MG-ECU 66. Each of FDC-ECU 60, battery ECU 64, and MG-ECU 66 includes a central processing unit (CPU), a memory (a read only memory (ROM) and a random access memory (RAM)), and an input and output buffer (none of which is shown). The CPU develops a program stored in the ROM on the RAM and executes the program. Processing to be performed by a corresponding ECU is described in a program stored in the ROM.

FDC-ECU 60 calculates output requested of FC system 20 (output electric power from FC system 20) based on travel power requested of FCV 1 and a request for charging and discharging of battery 40, and controls boost converter 24 such that FC system 20 outputs calculated electric power. Travel power requested of FCV 1 is calculated based on an amount of operation of an accelerator pedal and a vehicle speed. Though travel power is calculated by FDC-ECU 60 in the first embodiment, it may be calculated by another ECU (for example, a vehicle ECU (not shown) that controls the entire vehicle in a centralized manner).

FDC-ECU 60 switches a travel mode in accordance with setting made through mode switch 62. FCV 1 incorporates FC system 20 and battery 40 as power supplies, and battery 40 can store electric power. In FCV 1 according to the present first embodiment, four travel modes in accordance with usage of FC system 20 and battery 40 are available, and a user can select a travel mode by operating mode switch 62. The travel mode will be described in detail later.

Mode switch 62 is a switch for a user to set the travel mode. Mode switch 62 may be a dedicated switch or may be implemented on a touch panel display of a navigation apparatus or the like.

Battery ECU 64 monitors a voltage, a current, and a temperature of battery 40. A voltage, a current, and a temperature of battery 40 are detected by not-shown various sensors. Battery ECU 64 calculates an SOC of battery 40 based on values of detected voltage, current, and temperature of battery 40. The calculated SOC value is transmitted to FDC-ECU 60. The SOC may be calculated by FDC-ECU 60 based on values of detected voltage, current, and temperature of battery 40.

In FCV 1, battery 40 is connected to power line 70 without a converter being interposed, and an amount of charging and discharging of battery 40 is basically determined by a difference between travel power requested by inverter 12 and MG 10 and output from FC system 20. Therefore, charging and discharging and the SOC of battery 40 can be controlled by control of output from FC system 20 by FDC-ECU 60 based on travel power.

In FCV 1 according to the first embodiment, a target SOC representing a target of the SOC is calculated by FDC-ECU 60 in accordance with the travel mode. A requested amount of charging and discharging of battery 40 is then calculated based on a difference between the SOC and the target SOC such that the SOC of battery 40 is closer to the target SOC, and output from FC system 20 is controlled by FDC-ECU 60 based on the calculated requested amount of charging and discharging and travel power.

The target SOC will be described in detail later. Various known approaches such as an approach using an open circuit voltage (OCV)-SOC curve (a map) representing relation between the OCV and the SOC and an approach using an accumulated value of currents input to and output from battery 40 can be used as the method of calculating the SOC.

MG-ECU 66 receives a calculated value of travel power requested of FCV 1 from FDC-ECU 60, generates a signal for driving MG 10 with inverter 12 based on travel power, and outputs the signal to inverter 12.

<Description of Travel Mode>

As described above, FCV 1 includes FC system 20 and battery 40. In FCV 1 according to the present first embodiment, four travel modes in accordance with usage of FC system 20 and battery 40 are provided.

Figure 2:
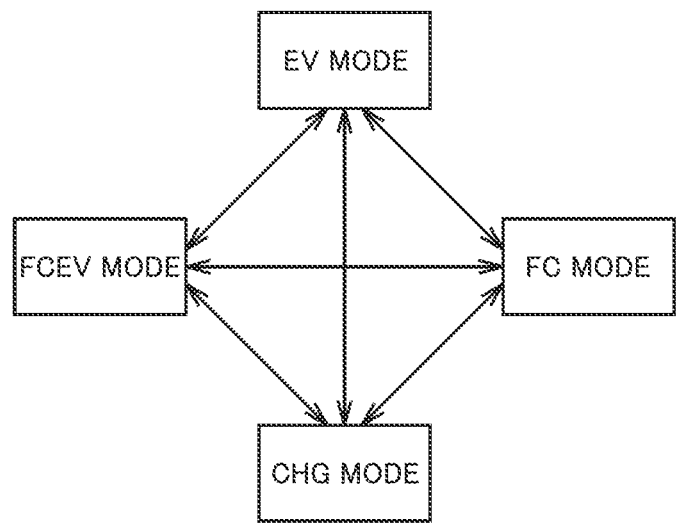
FIG. 2 is a diagram showing a travel mode provided in the FCV.

FIG. 2 is a diagram showing travel modes provided in FCV 1. Referring to FIG. 2, for FCV 1 according to the present first embodiment, four travel modes of an "FC mode," an "FCEV mode," an "EV mode," and a "CHG mode" are provided. A user of FCV 1 can select a desired travel mode from among the travel modes by using mode switch 62.

Figure 3:
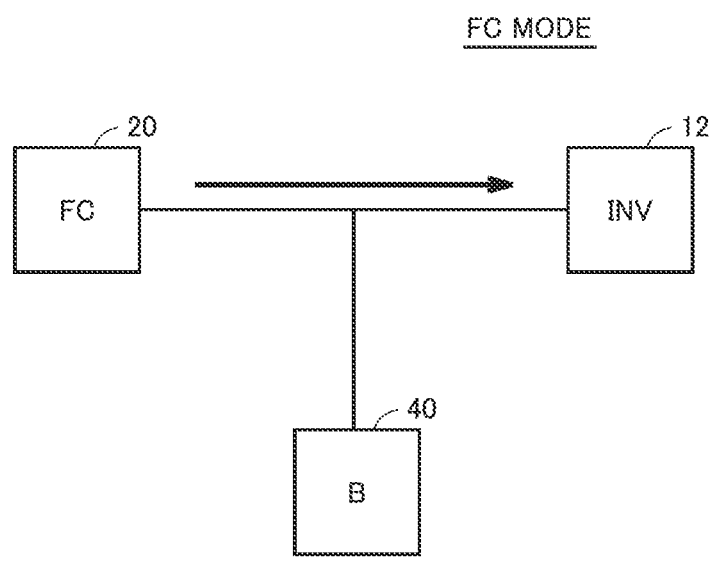
FIG. 3 is a diagram showing a basic flow of electric power in an FC mode.

FIG. 3 is a diagram showing a basic flow of electric power in the FC mode. Referring to FIG. 3, the FC mode refers to a travel mode for travel basically only with output from FC system 20 until fuel (hydrogen) in FC system 20 runs out. After fuel runs out, FCV 1 travels only with output from battery 40.

In the FC mode, in order to travel only with output from FC system 20, FDC-ECU 60 controls FC system 20 (boost converter 24) based on travel power such that FC system 20 outputs power comparable to power required by inverter 12, that is, travel power (a requested value).

Even in the FC mode, when high travel power is requested by strong pressing of the accelerator pedal and travel power exceeds an output upper limit Wfc of FC system 20, insufficiency in power is compensated for by battery 40. When regeneration by MG 10 is carried out as in braking of FCV 1, electric power generated by MG 10 is supplied from inverter 12 to battery 40. When the SOC of battery 40 has attained to the upper limit, regeneration by MG 10 is not carried out.

Figure 4:
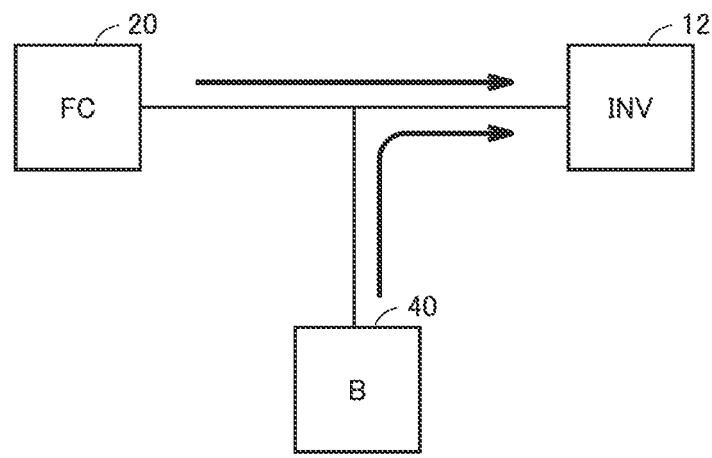
FIG. 4 is a diagram showing a basic flow of electric power in an FCEV mode.

FIG. 4 is a diagram showing a basic flow of electric power in the FCEV mode. Referring to FIG. 4, the FCEV mode is a characteristic travel mode in FCV 1 according to the present first embodiment and it is a hybrid mode in which output from FC system 20 and output from battery 40 are used in a balanced manner. Specifically, in the FCEV mode, FCV 1 travels with both of output from FC system 20 and output from battery 40 such that timing of run-out of fuel (hydrogen) in FC system 20 is simultaneous with timing of the SOC of battery 40 reaching a lower limit value SL.

Figure 5:
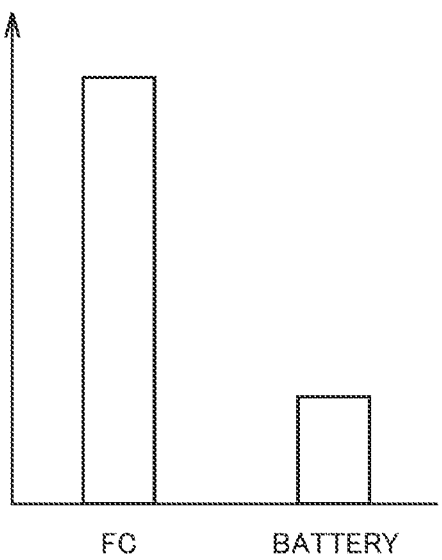
FIG. 5 is a diagram showing comparison between energy of hydrogen and energy of electric power stored in a battery.

In FCV 1 including FC system 20 and battery 40, hydrogen serving as fuel in FC system 20 and electric power stored in battery 40 are greatly different from each other in energy amount. Specifically, as shown in FIG. 5, energy of electric power stored in battery 40 is lower than hydrogen energy. Therefore, if fuel (hydrogen) is finished up earlier than the SOC of battery 40, although FCV 1 can thereafter travel with electric power stored in battery 40, traveling performance of FCV 1 is suddenly significantly restricted at the time point when fuel runs out.

In FCV 1 according to the present first embodiment, the FCEV mode is provided as one of the travel modes, and the user can select the FCEV mode by using mode switch 62. In the FCEV mode, FCV 1 travels with both of output from FC system 20 and output from battery 40 in order to avoid such a situation that fuel in FC system 20 runs out early and FCV 1 does remaining travel only with output from battery 40. Specifically, output from FC system 20 and output from battery 40 are adjusted such that timing of run-out of fuel in FC system 20 is simultaneous with timing of the SOC of battery 40 reaching lower limit value SL as described above. FCV 1 can travel with both of output from FC system 20 and output from battery 40 until energy (fuel and the battery) in FCV 1 runs out, and such a situation that fuel in FC system 20 runs out early and traveling performance of FCV 1 is suddenly significantly restricted can be avoided.

In order for timing of run-out of fuel in FC system 20 and timing of the SOC of battery 40 reaching the lower limit value to simultaneously come in the FCEV mode, in FCV 1 according to the present first embodiment, the target SOC of battery 40 is lowered with decrease in remaining amount of hydrogen in hydrogen tank 28. In other words, the target SOC is lowered with decrease in remaining amount of hydrogen such that the target SOC reaches the lower limit value at the time when hydrogen in hydrogen tank 28 runs out. Preferential use of FC system 20 over battery 40 can thus be suppressed.

In order to travel with both of output from FC system 20 and output from battery 40 while the SOC is controlled to follow the target SOC that lowers with decrease in remaining amount of hydrogen, control as below is carried out in FCV 1 while the FCEV mode is selected. Specifically, FDC-ECU 60 controls FC system 20 (boost converter 24) based on travel power and the SOC of battery 40 such that battery 40 outputs electric power to lower the SOC to the target SOC and FC system 20 outputs the balance of power required by inverter 12, that is, travel power (a requested value).

Even in the FCEV mode, when high travel power is requested by strong pressing of the accelerator pedal and travel power exceeds the output upper limit of FC system 20, electric power equal to or higher than output in accordance with a difference between the SOC and the target SOC is compensated for by battery 40. When regeneration by MG 10 is carried out as in braking of FCV 1, electric power generated by MG 10 is supplied from inverter 12 to battery 40.

Figure 6:
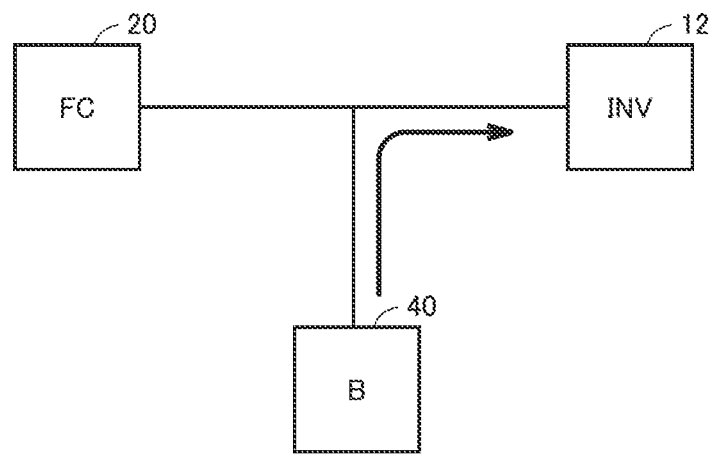
FIG. 6 is a diagram showing a basic flow of electric power in an EV mode.

FIG. 6 is a diagram showing a basic flow of electric power in the EV mode. Referring to FIG. 6, the EV mode refers to a travel mode for travel basically only with output from battery 40 without using fuel (hydrogen) in FC system 20.

Even in the EV mode, when high travel power is requested by strong pressing of the accelerator pedal and travel power exceeds an output upper limit Wout of battery 40, power comparable to insufficiency in power may be output from FC system 20. When regeneration by MG 10 is carried out as in braking of FCV 1, electric power generated by MG 10 is supplied from inverter 12 to battery 40.

Figure 7:
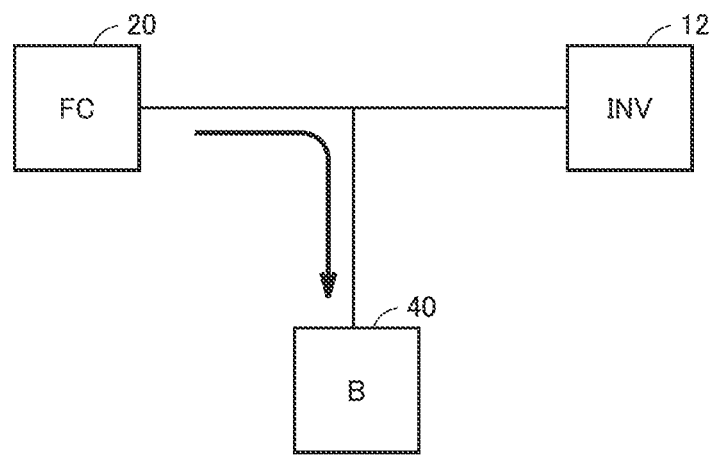
FIG. 7 is a diagram showing a basic flow of electric power in a CHG mode.

FIG. 7 is a diagram showing a basic flow of electric power in the CHG mode. Referring to FIG. 7, the CHG mode refers to a mode in which the SOC is raised to a prescribed level by positively charging battery 40 with output from FC system 20 when the SOC of battery 40 has lowered.

Even in the CHG mode, when travel power is requested by pressing of the accelerator pedal, electric power is supplied from FC system 20 to inverter 12. Furthermore, when high travel power is requested by strong pressing of the accelerator pedal, electric power is supplied also from battery 40 to inverter 12. When regeneration by MG 10 is carried out as in braking of FCV 1, electric power generated by MG 10 is supplied from inverter 12 to battery 40.

Figure 8:
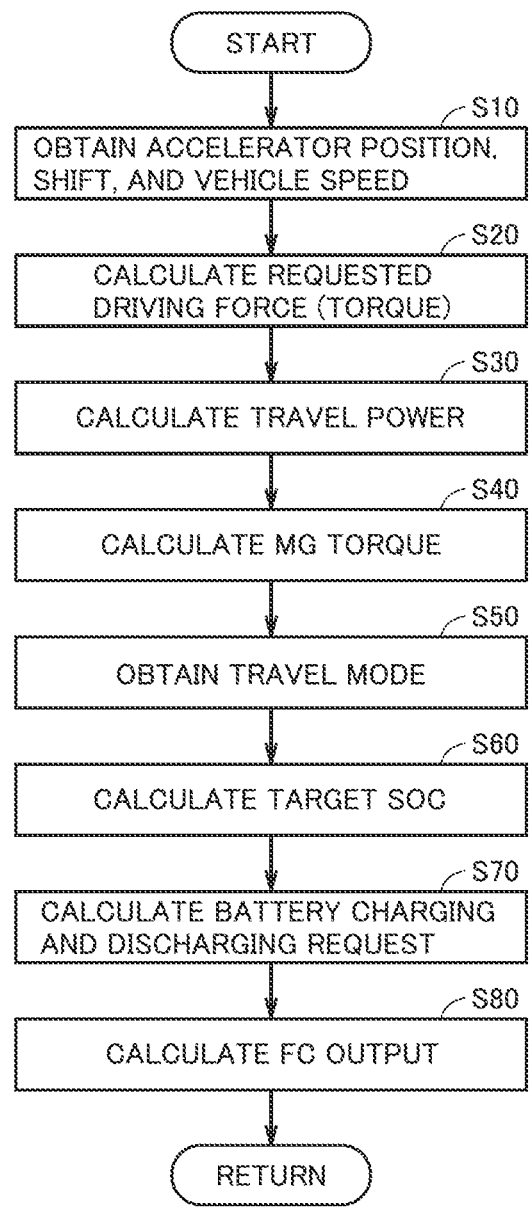
FIG. 8 is a flowchart showing an exemplary procedure in processing performed by an FDC-ECU.

FIG. 8 is a flowchart showing an exemplary procedure in processing performed by FDC-ECU 60. Some of processing may be allocated to battery ECU 64 or MG-ECU 66 or may be performed by another not-shown ECU (a vehicle ECU that controls the entire vehicle in a centralized manner). A series of processing shown in this flowchart is repeatedly performed every prescribed period.

Referring to FIG. 8, FDC-ECU 60 obtains information on an accelerator position, a shift range that has been selected, and a vehicle speed (step S10). The accelerator position is detected by an accelerator position sensor and the vehicle speed is detected by a vehicle speed sensor (neither of which is shown). Instead of a vehicle speed, the number of rotations of a driveshaft or a propeller shaft may be employed.

Then, FDC-ECU 60 calculates requested driving force (torque) based on information obtained in step S10, by using a driving force map prepared for each shift range that shows relation among requested driving force, an accelerator position, and a vehicle speed (step S20). Then, FDC-ECU 60 calculates travel power (a requested value) of FCV 1 by multiplying the calculated requested driving force by the vehicle speed and adding prescribed loss power (step S30).

In succession, FDC-ECU 60 calculates torque of MG 10 based on the requested driving force calculated in step S20 (step S40). Calculated torque of MG 10 is transmitted to MG-ECU 66, which controls inverter 12 such that MG 10 outputs that torque.

Then, FDC-ECU 60 obtains setting of the travel mode from mode switch 62 (step S50). When the travel mode has been set to the "FCEV mode," FDC-ECU 60 calculates the target SOC of battery 40 (step S60). The method of calculating the target SOC in the FCEV mode will be described later.

When the travel mode has been set to the "FC mode" or the "EV mode," the target SOC is basically not calculated. When the travel mode has been set to the "CHG mode," a value set in advance or a value set by a user is set as the target SOC.

Then, FDC-ECU 60 calculates a request for charging and discharging (power) of battery 40 (step S70). This requested amount of charging and discharging is calculated based on the SOC and the target SOC of battery 40. Specifically, by using the prepared map that shows relation between an SOC difference from the target SOC and the requested amount of charging and discharging, when the SOC is higher than the target SOC, the requested amount of charging and discharging is calculated as a larger positive value (a discharging request) as the SOC is higher, and when the SOC is lower than the target SOC, the requested amount of charging and discharging is calculated as a larger negative value (a charging request) as the SOC is lower.

An upper limit and a lower limit are set for the requested amount of charging and discharging. In the "FC mode" and the "EV mode" in which the target SOC is not calculated, the charging and discharging request is not calculated either.

Then, FDC-ECU 60 calculates output from FC system 20 (step S80). Specifically, when the travel mode has been set to the "FCEV mode," output from FC system 20 is calculated by subtracting the requested amount of charging and discharging calculated in step S70 from travel power calculated in step S30.

When the travel mode has been set to the "FC mode," travel power calculated in step S30 is set as output from FC system 20. When the travel mode has been set to the "EV mode," output from FC system 20 is set to 0, and when the travel mode has been set to the "CHG mode," an absolute value of the requested amount of charging and discharging (a negative value because charging is carried out) calculated in step S70 is set as output from FC system 20.

Boost converter 24 of FC system 20 is controlled by FDC-ECU 60 such that output from FC system 20 is set to the output calculated in step S80.

Figure 9:
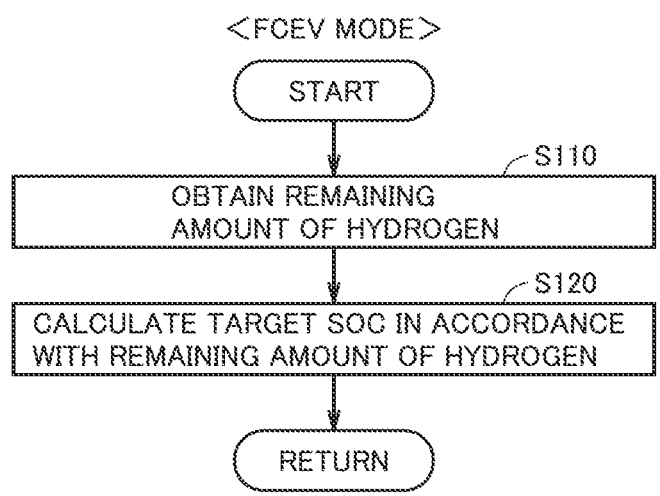
FIG. 9 is a flowchart showing an exemplary method of calculating a target SOC when the travel mode is set to the FCEV mode in step S60 in FIG. 8.

FIG. 9 is a flowchart showing an exemplary method of calculating a target SOC when the travel mode is set to the FCEV mode in step S60 in FIG. 8. Referring to FIG. 9, FDC-ECU 60 obtains a remaining amount of hydrogen in hydrogen tank 28 (step S110). The remaining amount of hydrogen can be calculated, for example, based on a detection value from a pressure sensor that detects a pressure in hydrogen tank 28.

Then, FDC-ECU 60 calculates the target SOC in accordance with the remaining amount of hydrogen, based on the remaining amount of hydrogen obtained in step S110 (step S120). Specifically, FDC-ECU 60 calculates the target SOC such that the target SOC lowers with decrease in remaining amount of hydrogen. Then, FDC-ECU 60 lowers the target SOC with decrease in remaining amount of hydrogen such that the target SOC attains to prescribed SOC lower limit value SL at the time when hydrogen in hydrogen tank 28 runs out.

Figure 10:
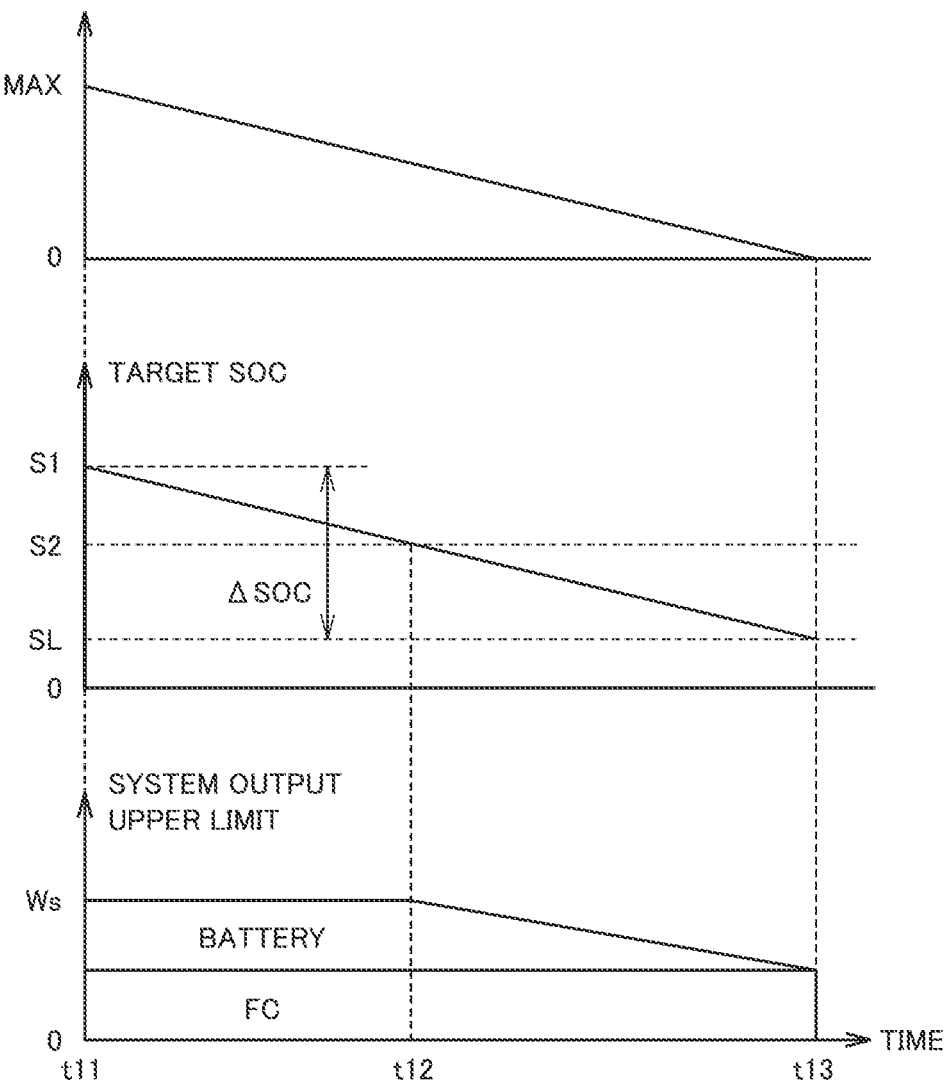
FIG. 10 is a diagram showing transition of a remaining amount of hydrogen, a target SOC, and a system output upper limit when the travel mode is set to the FCEV mode.

FIG. 10 is a diagram showing transition of a remaining amount of hydrogen, a target SOC, and a system output upper limit when the travel mode is set to the FCEV mode. The system output upper limit refers to the sum of the output upper limit of FC system 20 and the output upper limit of battery 40, which determines traveling performance (an output characteristic) of FCV 1.

Referring to FIG. 10, at time t11, travel is assumed to start from a state that hydrogen tank 28 is filled up with hydrogen. A target SOC at this time is denoted as S1 (for example, 70%) and a difference between S1 and SOC lower limit value SL (for example, 20%) is denoted as ΔSOC (50% in this example).

As the remaining amount of hydrogen decreases with travel, the target SOC is lowered with decrease in remaining amount of hydrogen as described above. Specifically, the target SOC is calculated in an expression below such that the target SOC lowers to SOC lower limit value SL at the time when hydrogen runs out (the remaining amount of hydrogen attains to 0) at time t13.

Target SOC=remaining amount of hydrogen/amount of fully filled hydrogen×ΔSOC+SOC lower limit value $SL$  (1)

For the system output upper limit, a value Ws which is the sum of the output upper limit of FC system 20 and the output upper limit of battery 40 is secured until time t12 and maximum traveling performance is secured. Relation between the system output upper limit and the SOC of battery 40 will now be described.

Figure 11:
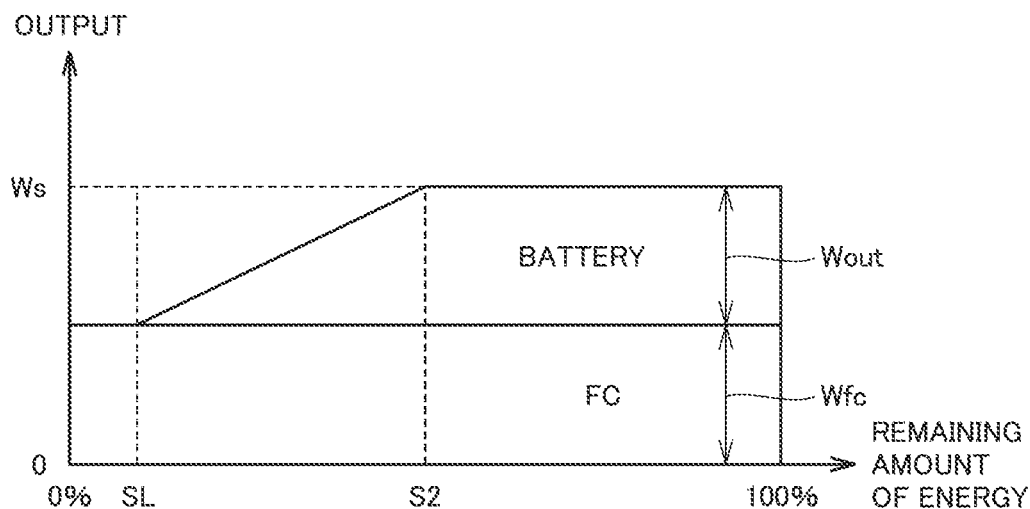
FIG. 11 is a diagram showing relation of a remaining amount of energy in an FC system and a battery with a system output upper limit.

FIG. 11 is a diagram showing relation of a remaining amount of energy in FC system 20 and battery 40 with a system output upper limit. In FIG. 11, the abscissa represents a remaining amount of energy (%) in each of FC system 20 and battery 40, and the ordinate represents the system output upper limit (W) which is the sum of the output upper limit of FC system 20 and the output upper limit of battery 40. The remaining amount of energy on the abscissa represents the remaining amount of hydrogen (100% representing a fully filled state) for FC system 20 and represents the SOC for battery 40.

Referring to FIG. 11, output upper limit Wfc of FC system 20 is constant regardless of the remaining amount of hydrogen. Namely, FC system 20 can output electric power up to output upper limit Wfc regardless of the remaining amount of hydrogen until fuel runs out. On the other hand, when the SOC becomes lower than a prescribed value S2, output upper limit Wout of battery 40 decreases with lowering in SOC, and attains to 0 when lower limit value SL is reached. Thus, when the SOC of battery 40 becomes lower than prescribed value S2, the system output upper limit which is the sum of output upper limit Wfc of FC system 20 and output upper limit Wout of battery 40 decreases with lowering in SOC.

Referring again to FIG. 10, when the target SOC becomes lower than S2 at time t12 or later, output upper limit Wout of battery 40 decreases with lowering in target SOC (≈actual SOC) and hence the system output upper limit also decreases from value Ws. At time t13, hydrogen runs out (the remaining amount of hydrogen attains to 0) and the SOC of battery 40 also attains to lower limit value SL.

In the present first embodiment, at time t12 or later, the system output upper limit gradually decreases, however, FCV 1 can travel with both of output from FC system 20 and output from battery 40 until energy (hydrogen and the battery) in FCV 1 runs out.

In contrast, when the travel mode has been set to the FC mode, FCV 1 travels basically only with output from FC system 20 until hydrogen runs out. Therefore, when hydrogen runs out (faster than in setting of the travel mode to the FCEV mode), the system output upper limit becomes equal to output upper limit Wout of battery 40. Therefore, after hydrogen runs out, traveling performance is greatly restricted.

As set forth above, in the first embodiment, when the travel mode has been set to the FCEV mode, the target SOC of battery 40 is lowered with decrease in remaining amount of hydrogen. Since output from battery 40 is thus also basically used for generation of travel power, preferential use of the FC than the battery as in the FC mode can be suppressed. Therefore, according to the first embodiment, sudden significant restriction of traveling performance due to early run-out of fuel can be avoided.

Second Embodiment

In this second embodiment, the target SOC of battery 40 is not lowered until the remaining amount of hydrogen decreases to a prescribed value, and when the remaining amount of hydrogen becomes smaller than the prescribed value, the target SOC is lowered with decrease in remaining amount of hydrogen. A period for which a maximum system output upper limit is secured, that is, a period for which maximum traveling performance is secured, can thus be longer than in the first embodiment.

The FCV according to this second embodiment is identical in overall configuration and travel mode to FCV 1 according to the first embodiment. The flow as a whole of processing performed by FDC-ECU 60 in the FCV according to the second embodiment is also the same as in the flowchart shown in FIG. 8.

Figure 12:
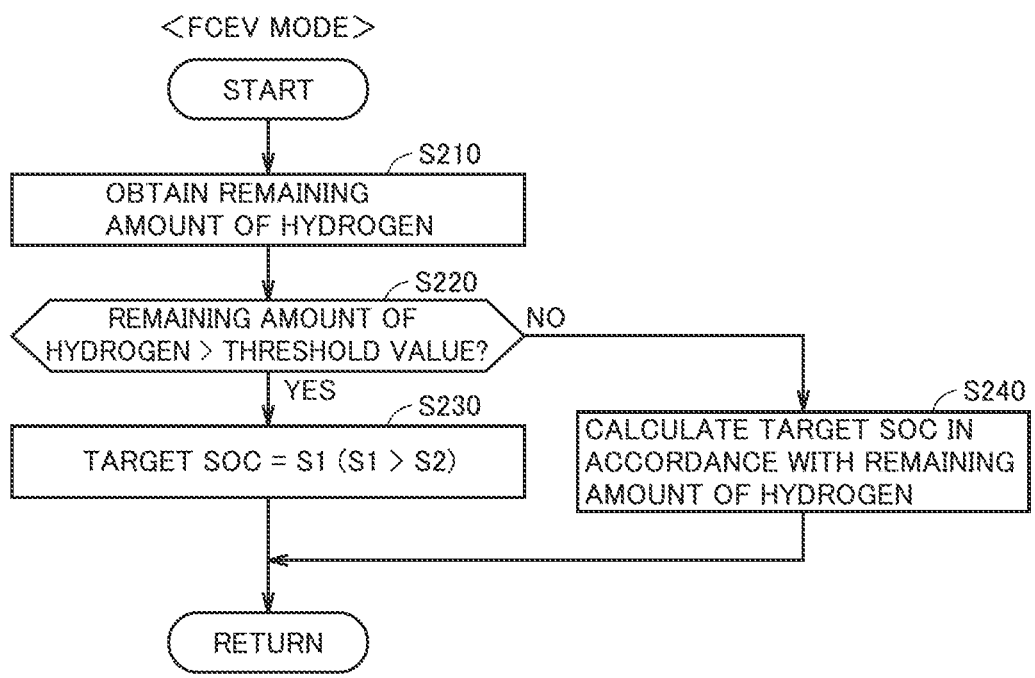
FIG. 12 is a flowchart showing an exemplary method of calculating a target SOC when the travel mode is set to the FCEV mode in a second embodiment.

FIG. 12 is a flowchart showing an exemplary method of calculating a target SOC when the travel mode is set to the FCEV mode in the second embodiment. This flowchart corresponds to the flowchart shown in FIG. 9 in the first embodiment.

Referring to FIG. 12, FDC-ECU 60 obtains a remaining amount of hydrogen in hydrogen tank 28 (step S210). Then, FDC-ECU 60 determines whether or not the remaining amount of hydrogen is larger than a threshold value H1 (step S220). This threshold value H1 defines timing to start lowering the target SOC in accordance with the remaining amount of hydrogen, and can be designed as appropriate depending on at which level the maximum system output upper limit (traveling performance) should be maintained (beyond which level the maximum system output upper limit should not be lowered).

When the remaining amount of hydrogen is determined in step S220 as being larger than threshold value H1 (YES in step S220), FDC-ECU 60 sets the target SOC of battery 40 to S1 (S1>S2) (step S230). S2 represents a threshold value that defines timing to start lowering output upper limit Wout of battery 40 with lowering in SOC as shown in FIG. 11 and S1 is larger than threshold value S2.

When the remaining amount of hydrogen is determined in step S220 as being equal to or smaller than threshold value H1 (NO in step S220), FDC-ECU 60 calculates the target SOC in accordance with the remaining amount of hydrogen, based on the remaining amount of hydrogen obtained in step S210 (step S240). Specifically, FDC-ECU 60 calculates the target SOC such that the target SOC lowers with decrease in remaining amount of hydrogen. Specifically, the target SOC is calculated in an expression below such that the target SOC lowers to SOC lower limit value SL at the time when hydrogen runs out (the remaining amount of hydrogen attains to 0) at time t24.

$$\text{Target SOC} = \text{remaining amount of hydrogen}/\text{threshold value } H1 \times \Delta SOC + \text{SOC lower limit value } SL \quad (2)$$

FIG. 13 is a diagram showing transition of a remaining amount of hydrogen, a target SOC, and a system output upper limit when the travel mode is set to the FCEV mode in the second embodiment. FIG. 13 corresponds to FIG. 10 referred to in the first embodiment.

Referring to FIG. 13, also in this example, travel is assumed to start at time t21 from the state that hydrogen tank 28 is filled up with hydrogen. A target SOC at this time is denoted as S1 (for example, 70%) and a difference between S1 and SOC lower limit value SL (for example, 20%) is denoted as ΔSOC (50% in this example).

Though the remaining amount of hydrogen decreases with travel, the target SOC is not lowered until the remaining amount of hydrogen decreases to threshold value H1 at time t22 in the second embodiment. When the remaining amount of hydrogen becomes smaller than threshold value H1 at time t22 or later, the target SOC is lowered with decrease in remaining amount of hydrogen. Specifically, the target SOC is calculated based on the expression (2) above such that the target SOC lowers to SOC lower limit value SL at the time when hydrogen runs out (the remaining amount of hydrogen attains to 0) at time t24.

When the target SOC becomes lower than S2 at time t23, output upper limit Wout of battery 40 is lowered (FIG. 11) with lowering in target SOC (≈actual SOC) and hence the system output upper limit also lowers from value Ws. At time t24, hydrogen runs out (the remaining amount of hydrogen attains to 0) and the SOC of battery 40 also attains to lower limit value SL.

As set forth above, when the SOC lowers with lowering in target SOC and the SOC becomes lower than prescribed value S2, output from battery 40 is restricted and traveling performance is restricted. In this second embodiment, however, the target SOC is lowered when a remaining amount of fuel becomes smaller than threshold value H1. In other words, the target SOC is not lowered until the remaining amount of fuel becomes smaller than threshold value H1. Therefore, according to this second embodiment, sufficient traveling performance can be secured until the remaining amount of fuel decreases to threshold value H1.

Though embodiments of the present disclosure have been described above, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A fuel cell vehicle comprising:
    a fuel cell system output of which can be adjusted;
    a power storage;
    a driving device that receives electric power from at least one of the fuel cell system and the power storage and generates travel power; and
    a controller that controls output from the fuel cell system to adjust an SOC of the power storage to a target SOC while electric power is supplied from the fuel cell system to the driving device, wherein
    when a remaining amount of fuel in the fuel cell system decreases, the controller lowers the target SOC.

2. The fuel cell vehicle according to claim 1, wherein
when the remaining amount of fuel becomes smaller than a threshold value, the controller lowers the target SOC with decrease in the remaining amount of fuel.

3. The fuel cell vehicle according to claim 1, wherein
the controller lowers the target SOC with decrease in the remaining amount of fuel such that the target SOC attains to a lower limit value at timing when fuel in the fuel cell system runs out.

4. The fuel cell vehicle according to claim 1, wherein
the fuel cell system includes
    a tank where fuel is stored,
    a fuel cell stack that generates electric power with fuel stored in the tank, and
    a converter that adjusts output from the fuel cell stack, and
the power storage is electrically connected to a power line between the converter and the driving device.

5. The fuel cell vehicle according to claim 1, further comprising a charger that charges the power storage with a power supply outside the vehicle.

* * * * *